Figure 1:
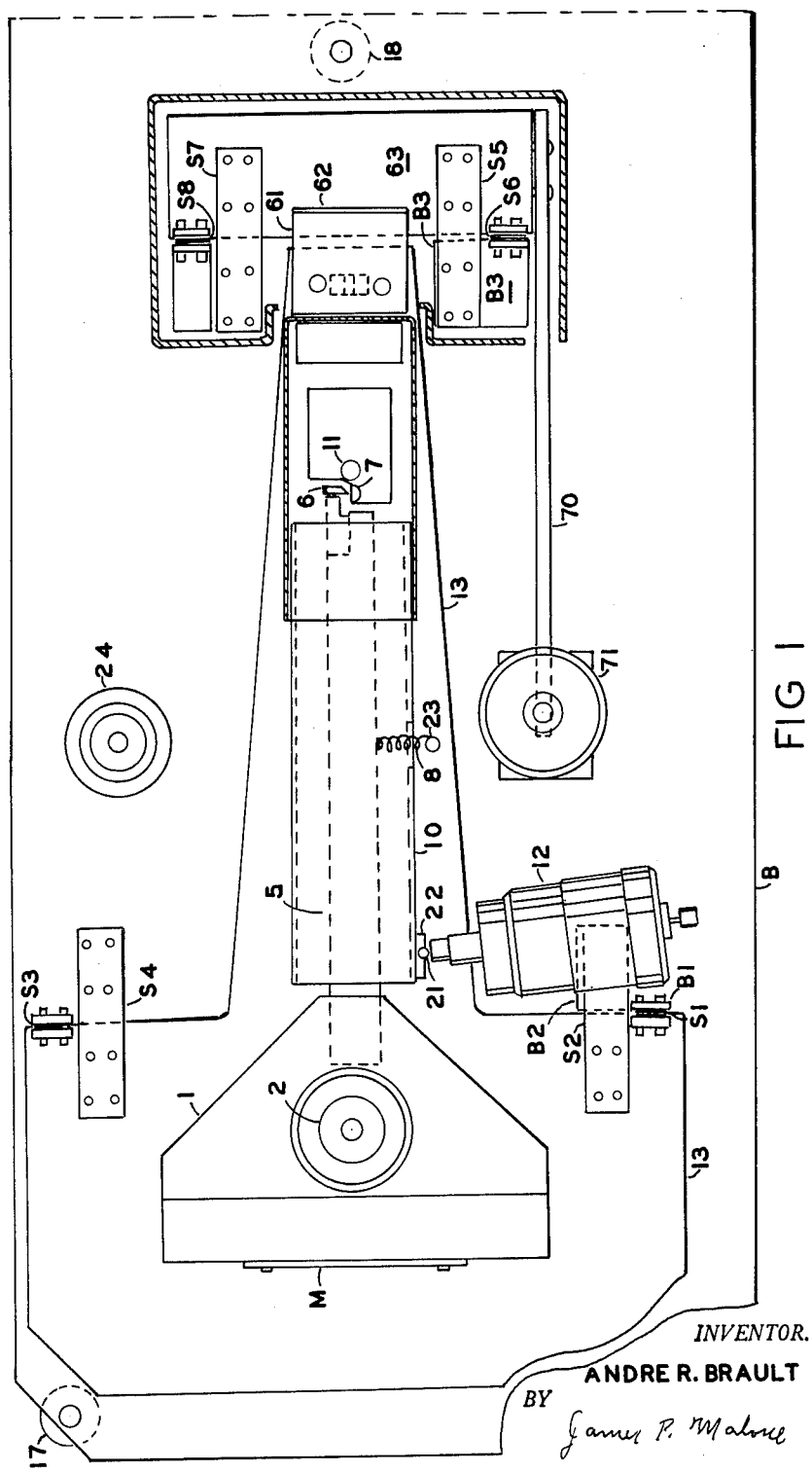

Dec. 21, 1965 A. R. BRAULT 3,224,099
MEANS FOR OPTICAL MEASURING ABOUT TWO AXES
Filed Aug. 30, 1961 3 Sheets-Sheet 1

INVENTOR.
ANDRE R. BRAULT
BY
James P. Malone

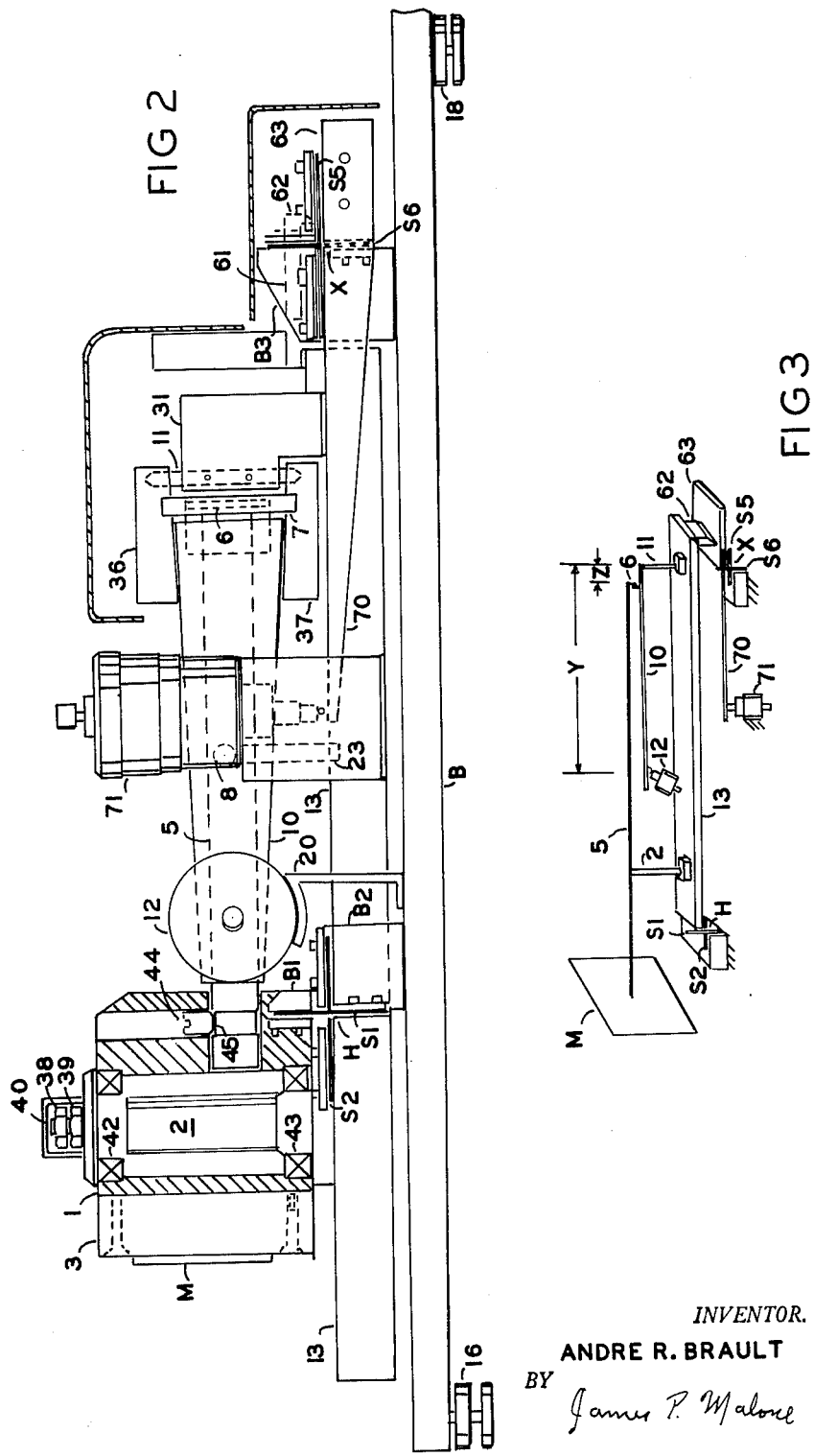

INVENTOR.
ANDRE R. BRAULT
BY James P. Malone

United States Patent Office 3,224,099
Patented Dec. 21, 1965

3,224,099
MEANS FOR OPTICAL MEASURING ABOUT TWO AXES
Andre R. Brault, North Merrick, N.Y., assignor to Optomechanisms, Inc., Mineola, N.Y.
Filed Aug. 30, 1961, Ser. No. 135,026
2 Claims. (Cl. 33—69)

This invention relates to optical measuring means and more particularly to means for measuring very small angles with very great accuracy, about horizontal and vertical axes.

More specifically the invention provides means to calibrate optical instruments, guidance systems, radiant energy apparatus and precision mechanical devices for collimation or other small angular deviations or corrections about two axes.

This application is a continuation in part of my prior co-pending application for Optical Measuring Means, Serial No. 50,893, filed August 22, 1960, now patent 3,056,207. That invention only measures the angle about the vertical axis. The present invention improves on the prior invention by providing an additional micrometer measurement about a horizontal axis.

The present invention provides means for measuring horizontal and vertical angles of a few seconds or fractions thereof and provides a micrometer adjustment having one micrometer division for every $1/10$ second of angle with an accuracy of .25 second R.M.S.. The present device is made compact enough for field use by means of a parallel lever linkage mounted on precision miniature bearings.

More specifically the present invention comprises a mirror adapted to receive and reflect light rays. The mirror is mounted on a first mounting means for angular horizontal rotation around a vertical axis. A long bar is fixedly connected to the mirror and extends rearwardly along the horizontal axis of the mirror and terminates in a knife edge bearing against a motion reducing lever, the other end of which is operated with a horizontal measuring micrometer. The knife edge contact provides a substantially linear motion so that calibrated readings may be obtained directly from the micrometer.

The measurement of the vertical motion about a horizontal axis is provided by mounting the first mounting means on two pairs of crossed springs adjacent the mirror and providing a knife edge at the other end of the first mounting means. A knife edge bears on a bearing block which is pivotally mounted on two pairs of crossed springs. The bearing block is connected to a long lever which bears against a second micrometer which is adapted to measure the vertical motion.

Accordingly a principal object of the invention is to provide new an improved two axes angle measuring means.

Another object of the invention is to provide new and improved collimating testing means about two axes.

Another object of the invention is to provide new and improved optical testing means.

Another object of the invention is to provide new and improved means for measuring very small horizontal and vertical angles optically and with great accuracy.

Another object of the invention is to provide new and improved means for reading small horizontal and vertical angles with a direct micrometer reading of one micrometer division per $1/10$ second of angle.

Another object of the invention is to provide new and improved two axes collimating means which is small, portable and light weight for easy handling in laboratory and field use.

Figure 4:
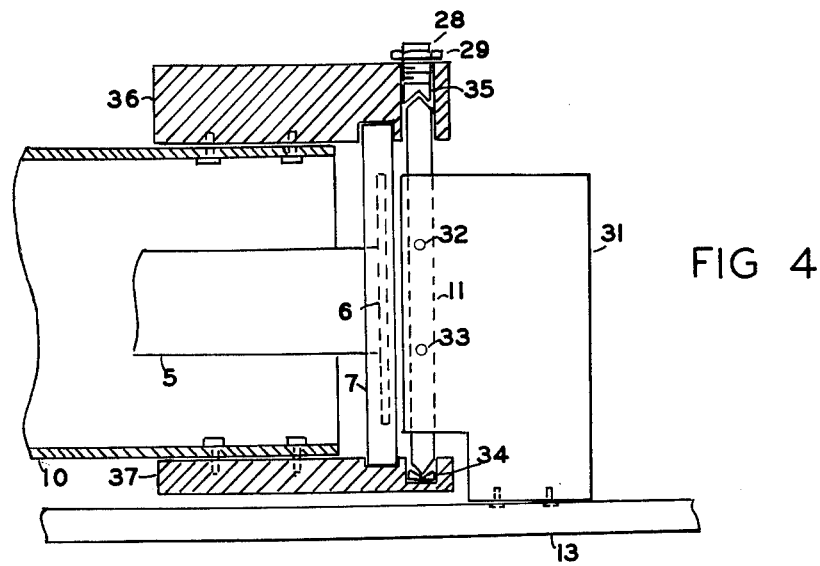
Figure 5:
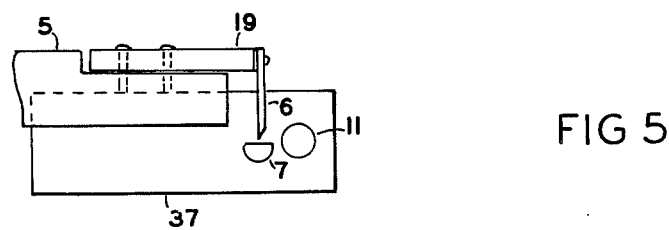
Figure 6:
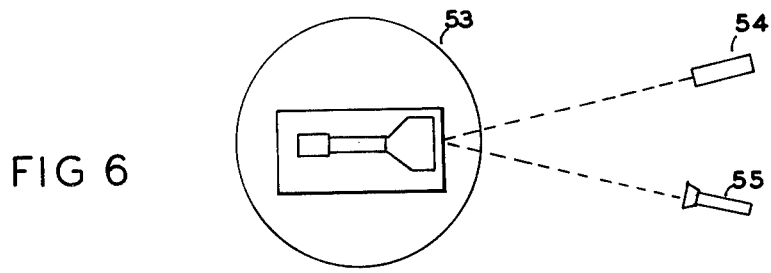

These and other objects of the invention will be apparent from the following specification and drawings of which FIG. 1 is a top view of an embodiment of the invention,
FIG. 2 is a side view partially in section of the embodiment of FIG. 1,
FIG. 3 is a diagram illustrative of the operation of the invention,
FIGS. 4 and 5 are detail views of the embodiment of FIGS. 1 and 2, and
FIG. 6 is a diagram illustrative of the use of the invention.

Referring to the figures the invention generally comprises a mirror M which is mounted on block 1, and an adjustable mounting 3 for horizontal angular rotation about pivot shaft 2. The mirror is adapted to receive and reflect light rays very accurately. A long horizontal bar 5 is fixedly connected via block 1 to the mirror, for angularly rotating the mirror about the pivot shaft 2. The bar 5 terminates in a knife edge 6 which bears against bearing block 7, by means of the tension spring 8. The bearing block 7 is connected to the outside of hollow lever 10 which is mounted on stationary vertical shaft 11 for horizontal angular rotation. The lever 10 is adapted to be rotated by means of the micrometer 12 which bears against it. The pivot shaft 2 is mounted on lever 13.

More specifically, the lever 10 is a hollow member inside which the bar 5 is located. The micrometer 12 is mounted on the base B by means of the bracket 20 and bears against the ball contact 21 mounted in the holding bracket 22 connected to the lever 10. Holding bracket 22 is adjustable in a motion parallel to lever 10 preferably. The spring 8 connected to the center bar 5 extends through an aperture in the member 10 and is anchored to a post 23 mounted on the lever 13. A bubble type level 24 is also mounted on the base B. Suitable leveling screws 16, 17, 18 are connected to base B.

The lever 5 mounting is as follows:
The shaft 2 is fixedly connected to the lever member 13 with nuts 38, 39, on bolt 40. The block 1 which may be a solid casting is rotatably mounted on the shaft 2 by means of the bearings 42, 43. The long lever 5 is mounted in a hole in the block 1 and secured there by means of the set screw 44 bearing on the flat portion 45 of the lever bar 5. The length of the lever bar 5 is adjusted by loosening set screw 44, moving the bar lengthwise and then clamping with set screw 44. The bar 5 is preferably made of invar steel alloy or may be made of an alloy similar in coefficient of expansive to lever 13 for temperature compensating means. The knife edge 6 is mounted on the bar 5 by means of block 19, so that the knife edge is on a line through the center of mirror M. The knife edge 6 and the block which it bears against are also preferably made of tool steel. The mirror M may be a 3 inch diameter optically flat aluminized mirror or any other optically flat surface from any suitable material. It is mounted on the block 1 by means of adjustable mounting 3.

The lever 10 assembly is as follows:
The shaft 11, FIG. 4 is fixedly mounted to the block 31 by means of the set screws 32, 33, the block 31 being fixedly connected to the lever 13. The shaft 11 is made of tool steel with cone points on the ends. The hollow lever 10 is mounted on the shaft 11 with a pair of cone point bearings 34, 35 which are mounted in the support blocks 37, 36 which are fixedly connected to the outside hollow lever 10. More specifically, the upper cone point bearing 35 is mounted in an adjustment screw 28 which is threaded into the block 36 and the adjustment is locked by means of the lock nut 29. The bearing blocks 36 and 7 are fixedly mounted to the block 37.

The long lever 13 is mounted for rotation about the horizontal axis H which is the intersection of two pairs of crossed flexure members. One pair of flexure members comprises leaf spring S1 which is connected to the member 13 at its lower end and to the block B1 on base B at its upper end. The other spring S2 extends horizontally and is connected to the member 13 at its forward end towards the mirror, and is connected to the base B at its rearward end by means of the block B2. Another pair of crossed springs S3 and S4 are similarly mounted on the opposite side.

The other end of the member 13 has connected thereto a block 61 which terminates in a knife edge 62 which bears down on a rotatably mounted bearing block 63. The bearing block 63 is rotatably supported on the base B, by means of a second pair of crossed springs. Horizontal spring S5 is connected to the block 63 at its rearward end and to the base block B3 at its forward end. The block 63 is also supported by means of the vertical spring S6 which is connected to the block 63 at its lower end and to the base B by means of the block B3. There is another pair of crossed springs S7 and S8 similarly connected on the opposite side, their intersection of the springs S5 and S6, and the knife edge 62. The springs provide a very accurate axis of rotation as there is no wear involved which would be the case as the rotation was mounted on a shaft which would be subject to wear and therefore inaccuracy.

The operation of the device is as follows:

The knife edge 6 is held agains tthe bearing block 7, with a line contact by means of the spring 8. If the micrometer 12 is turned it will cause the lever 10 to rotate horizontally about the pivot 11 which will also cause movement of the bearing block 7, and the knife edge 6 which in turn will cause the mirror to rotate horizontally about the pivot shaft 2. The motion of the micrometer is reduced by the ratio of $z/y$ (FIG. 3) and since the contact of the knife edge for small angles is essentially a point contact the angle of lever 10 about the pivot shaft 11 has a definite linear relation to the angle of the bar 5 and mirror M about the pivot shaft 2. Therefore, the readings of the micrometer 12 may be very accurately calibrated. Also the lever linkage automatically compensates for temperature variations.

The entire horizontally moving combination described above is mounted on the lever 13. The lever 13 is mounted by means of the crossed springs S1, S2, and S3, S4 for rotation about the horizontal axis H defined by the intersection of those springs. Lever 13 being supported in tension on S1 and S3 for greater accuracy. The lever 13 is rotated about that axis by means of the lever 70 which is fixedly connected to the block 63 and the forward end of the lever 70 bears against the vertical measuring micrometer 71.

Therefore, when the micrometer 71 is turned so as to move its thrust motion downwardly the lever 70 and block 63 rotates counter clock wise about the axis X formed by the intersection of the crossed springs S5, S6, and S7, S8, lever 10 being supported in tension on S6 and S8 for greater accuracy. The weight of the lever 13 assembly causes the knife edge 62 to follow block 63, causing lever 13 to rotate clockwise around axis H. The measurement of micrometer 71 is very accurate because of the mechanical multiplication of the lever system, as described in connection with FIG. 3.

In one embodiment of the present invention the overall length of the instrument was about 20″ and the width about 10″. The maximum angular displacement was 16.7 minutes. The accuracy was .25 second of angle R.M.S. and each division of the micrometer was .1 second of angle.

In operation, to measure a desired angle, the apparatus is set up with a ray of light coming from test piece. For instance, referring to FIG. 6 a typical problem is to measure or check an angle of a precision rotating table 53. The present invention is set on the table as shown. A point source of light is provided by the collimator 54 and the reflection is read by the telescope 55. The setup is initially aligned so that the image of the collimator appears at the cross hairs of the telescope. The rotating table is then rotated a horizontal angle to be measured and the angle is measured by the horizontal motion of the mirror as read on the micrometer 12, required to bring back the collimator dot or image to the cross hairs of the telescope.

The operation is then repeated in the vertical axis making the measurement with the micrometer 71.

Many other ways of using the present invention will occur to those having particular problems, the number of applications being limited only by the number of problems.

Many modifications may be made by those who desire to practice the invention without departing from the scope thereof which is outlined by the following claims.

I claim:

1. Horizontal and vertical optical angle measuring means comprising a frame, a brearing block, means to rotatably mount said bearing block about a horizontal axis adjacent one end of said frame comprising a pair of crossed springs connected to said frame and said bearing block, a first substantially horizontal lever connected to said bearing block, a first micrometer mounted to said frame and adapted to bear against said lever in a vertical plane, a second lever, means to rotatably mount said second lever about a horizontal axis on said frame comprising a second pair of crossed springs connected near the other end of said frame, said second lever having a horizontal knife edge at its other end bearing on the top of said bearing block, a third lever pivotally mounted on said second lever for horizontal movement adjacent said rotatable mounting of said second lever, a mirror mounted on one end of said third lever, the plane of said mirror being perpendicular to the axis of said third lever, a vertical knife edge at the other end of said third lever, a fourth hollow member lever pivotally mounted on said second lever for horizontal rotation, said hollow lever symmetrically enclosing said third lever in balance relation, said knife edge on said third lever bearing against said fourth lever adjacent to its pivot point, and a second micrometer mounted on said frame in a horizontal plane and adapted to bear against said fourth lever.

2. Two axes optical angle measuring means comprising, a base,
a member pivotally mounted at one end to said base along a horizontal axis,
a mirror adapted to receive and reflect optical rays,
means to mount said mirror on said member for substantially horizontal angular motion about a substantially vertical axis and means to measure said horizontal angular motion comprising;
a horizontal bar pivotally mounted on said member, said bar being fixedly connected to said mirror for angular horizontal rotation and extending rearwardly from said mirror along the center axis thereof,
a vertical knife edge connected to the end of said bar,
a hollow lever pivotally mounted on said member and enclosing said bar and symmetrically related to the neutral axis of said bar and pivoted for horizontal angular motion at a point on the center line of said bar when said bar is centered,
said point being slightly further from said mirror than said knife edge,
a bearing block mounted on said lever adjacent said lever pivot point,
spring means causing said knife edge to bear against said bearing block,
a first micrometer connected to said hollow lever adjacent the other end thereof and adapted to actuate said lever in a horizontal angular motion,
a horizontal knife extending downwardly at the other end of said member, a platform pivotally mounted about a horizontal axis on said base, an extension arm connected to said platform, and a second micrometer on said base contacting said arm to measure the angle of said platform about its horizontal axis.

References Cited by the Examiner

UNITED STATES PATENTS

| 1,114,422 | 10/1914 | Von Winterhalder | 33—69 |
| 1,624,654 | 4/1927 | Brittain | 33—147 |
| 1,762,810 | 6/1930 | Brittain et al. | 51—165.20 |
| 1,953,804 | 4/1934 | Hayes | 33—69 |
| 2,030,237 | 2/1936 | Brittain et al. | 33—147 |
| 2,706,253 | 4/1955 | Hutchins et al. | 88—14 |
| 3,056,207 | 10/1962 | Brault | 33—72 |

FOREIGN PATENTS

| 2,359 | 1878 | Germany. |
| 13,075 | 3/1881 | Germany. |
| 555 | 1857 | Great Britain. |

ISAAC LISANN, *Primary Examiner.*

ROBERT B. HULL, *Examiner.*